Figure 1:
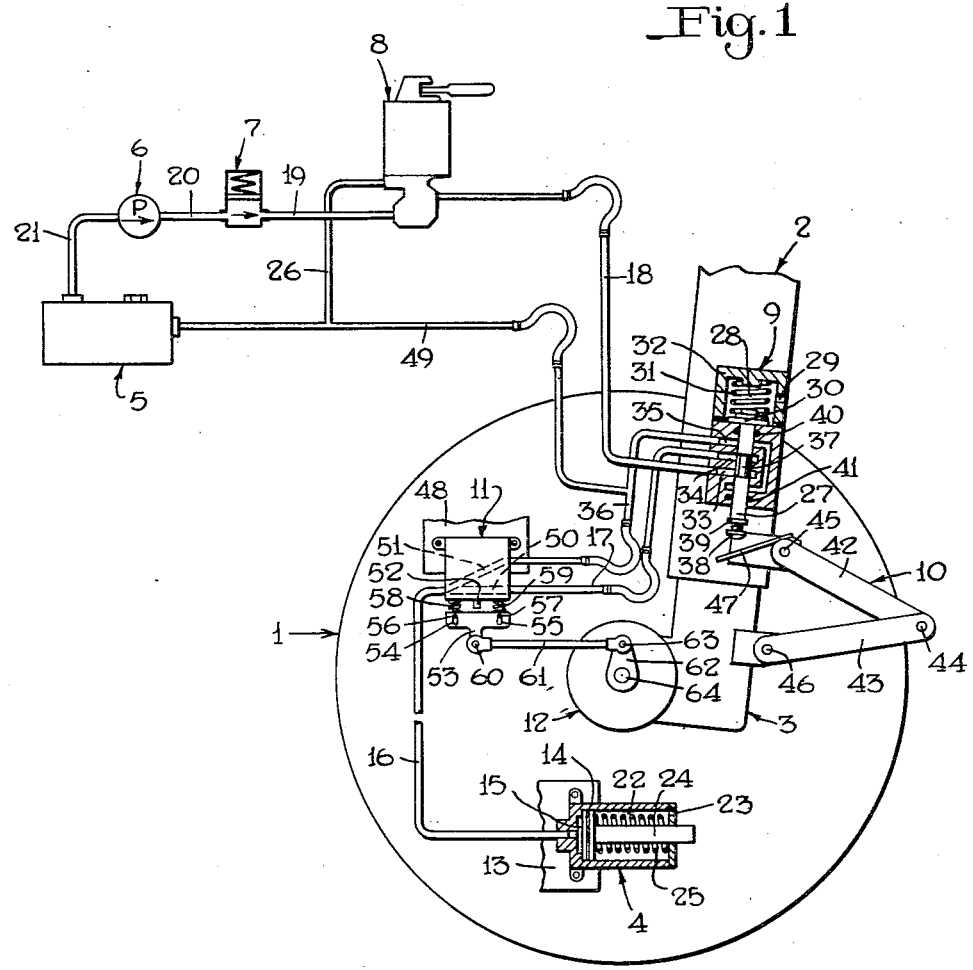

Jan. 15, 1957     C. W. BERKOBEN     2,777,654
AIRPLANE BRAKE CONTROL APPARATUS

Filed Aug. 25, 1953     2 Sheets-Sheet 1

INVENTOR.
Charles W. Berkoben
BY
Adelbert A. Steinmiller
ATTORNEY

Jan. 15, 1957  C. W. BERKOBEN  2,777,654
AIRPLANE BRAKE CONTROL APPARATUS
Filed Aug. 25, 1953  2 Sheets-Sheet 2

INVENTOR.
Charles W. Berkoben
BY
Adelbert A. Steinmiller
ATTORNEY

United States Patent Office 2,777,654
Patented Jan. 15, 1957

2,777,654

AIRPLANE BRAKE CONTROL APPARATUS

Charles W. Berkoben, Irwin, Pa., assignor to Westinghouse Air Brake Company, Wilmerding, Pa., a corporation of Pennsylvania Application August 25, 1953, Serial No. 376,295

3 Claims. (Cl. 244—111)

This invention relates to airplane brake control apparatus and, more particularly, to means for preventing sliding of airplane wheels due to braking the wheels while the airplane is landing.

As is well known, when landing an airplane, it is desirable to accelerate the landing wheels as soon after touchdown as possible, if not prior to touchdown, to the ground speed of the airplane to prevent sliding the wheels on the runway, thereby eliminating undesirable wear and possible blowouts of the tires.

Means in the form of automatic wheel-slip detecting devices have heretofore been provided in the brake system of an airplane to automatically respond to a slipping condition of the landing wheel on a runway to release the brakes and thereby prevent sliding of said wheels and upon termination of the slipping condition to reapply the brakes. Such a device is disclosed, for example, in U. S. Patent No. 2,573,387, issued to Rankin J. Bush on October 30, 1951. These devices however are chiefly designed to prevent sliding of the landing wheels only if a brake application is made by the pilot of the airplane after said landing wheels have made contact with the runway and have begun to accelerate to the ground speed of the airplane. It is possible that the pilot may inadvertently make a brake application prior to touchdown of the landing wheels while the airplane is still airborne. In such a case, the landing wheels would be in a locked position at touchdown, due to which the wheel-slip detecting device, disclosed in the aforementioned patent, could not operate to release the brakes on the landing wheels so that said wheels would slide along the runway, which sliding would cause undue wear of the tires and could possibly result in serious damage to the airplane and its occupants.

Accordingly, one object of my invention is to provide an airplane brake control apparatus embodying means for automatically preventing application of brakes to the landing wheels until after said wheels have made contact with the runway surface and a certain amount of the airplane weight has settled onto said wheels.

A further object of my invention is to provide an improved airplane brake control apparatus embodying means for automatically preventing brake application on the landing wheels of the airplane prior to touchdown and for then so controlling brake application to said wheels as to avoid sliding thereof on a runway while bringing the airplane to a stop, even though the pilot, prior to said touchdown, may have operated the brake control device to a brake applying position.

Figure 2:
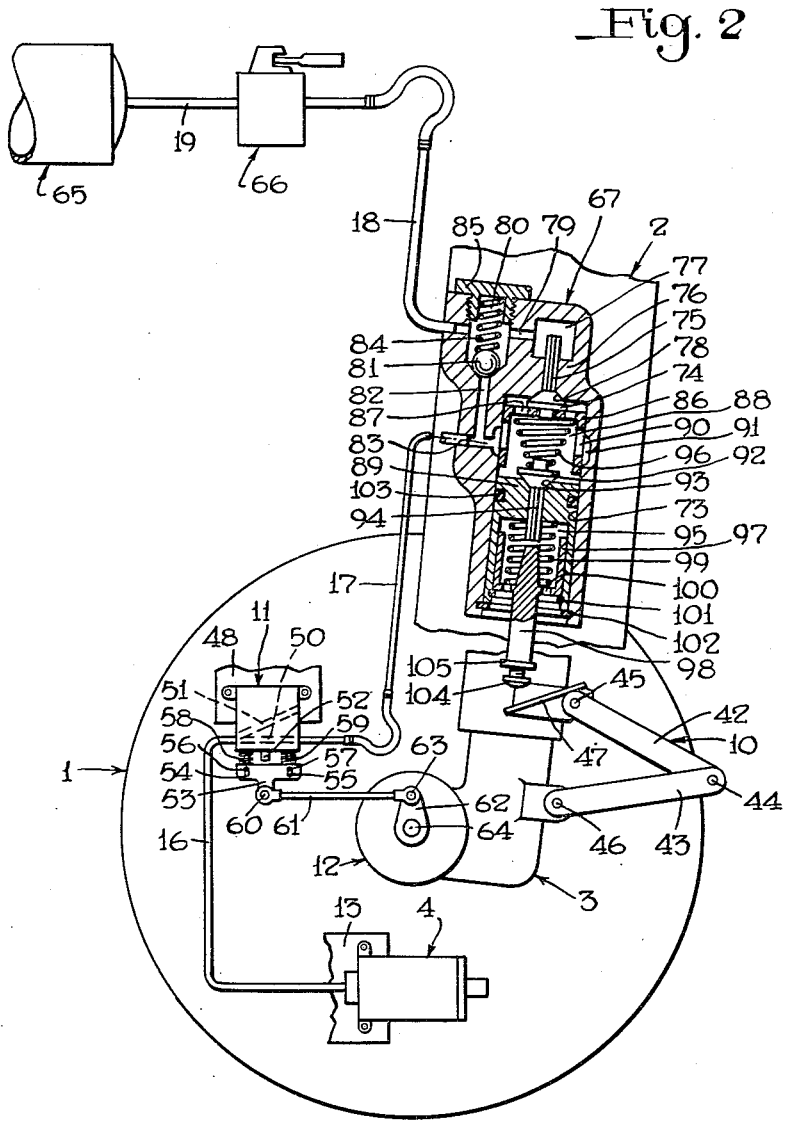

Other objects and advantages of the invention will appear in the following more detailed description thereof made in connection with the accompanying drawings, wherein:

Fig. 1 is a diagrammatic view, partly in section and partly in outline, of a hydraulic pressure operable airplane brake control apparatus embodying the invention, and Fig. 2 is a diagrammatic view, partly in section and partly in outline, of a pneumatic pressure operable airplane brake control apparatus embodying the invention.

*Description*

As shown in Fig. 1, the numeral 1 designates a landing wheel of an airplane mounted on a resilient airplane landing gear of which a portion of a strut assemblage 2 and a cylinder assemblage 3 is shown. The axle (not shown) of the landing wheel 1 is mounted on the cylinder assemblage 3 which telescopes into the strut assemblage 2, while said strut assemblage is mounted on the body of the airplane. Yieldable means (not shown) are provided in the strut assemblage 2 for absorbing the landing shock when the wheel 1 contacts the runway and for permitting the cylinder assemblage 3 to telescope into the strut assemblage 2 to what may be called a loaded position, in which it is shown in the drawing and in which the entire weight of the airplane is resting on the landing gear. The same yieldable means will bias the cylinder assemblage 3 out of the strut assemblage 2, when the airplane is airborne or the weight of the airplane is taken off the landing gear, to fully unloaded position. The extent to which the cylinder assemblage 3 is telescoped into the strut assemblage 2 is relative to the load resting on the wheel 1.

The brake control apparatus constituting this embodiment of the invention comprises a wheel brake cylinder device 4, a source of hydraulic fluid, or sump 5, a pump 6, an accumulator 7, a manually operable brake control valve device 8, an interceptor, or cut-out, valve device 9, a hinged lever 10, and, if desired, a release valve device 11 and a wheel-slip detecting, or control, device 12.

The wheel brake cylinder device 4, mounted on a non-rotatable portion 13 of the wheel mounting, is adapted to be arranged in conventional manner for applying brakes (not shown) to the wheel 1 and, for purposes of illustration, comprises a casing containing a piston 14 at one side of which there is a pressure chamber 15 which may be connected through a conduit comprising pipes 16, 17, 18, 19, 20, and 21 to the sump 5 and at the opposite side a non-pressure chamber 22 vented to atmosphere through a port 23 in said casing. The piston 14 has concentrically associated therewith in chamber 22 a piston rod 24 extending beyond the limits of the casing and adapted for controlling the brakes of the wheel 1 by suitable means not shown. Upon pressurization of hydraulic fluid drawn from the sump 5 and delivered to chamber 15, by means which will hereinafter be described, the piston 14 and the piston rod 24 are adapted to be moved in the direction of the right hand, as viewed in the drawing, to a brake applying position in which the brakes on the wheel 1 are applied. Upon removal of pressure on the hydraulic fluid in the chamber 15, a spring 25 may be provided in chamber 22 to act on piston 14 to move said piston and the piston rod 24 back to a normal position, in which they are shown in the drawing and in which the brakes on wheel 1 are released.

The sump 5 contains a supply of hydraulic fluid to which pipe 21 is connected. The pump 6 is interposed between pipes 21 and 20, while the accumulator 7 is interposed between pipes 20 and 19, pipe 19 being also connected to the brake valve device 8. The pump 6, which is represented symbolically, draws hydraulic fluid from the sump 5 through pipe 21 and pumps said fluid into the accumulator 7 through pipe 20. An electric motor (not shown) may be adapted for driving the pump 6, said motor being automatically controlled by a pressure switch (not shown) associated with the accumulator 7 to permit said motor to be cut out when the fluid pressure in said accumulator has reached a certain maximum point and to be cut in when the fluid pressure in said accumulator has been reduced to a certain minimum point.

The manually operable brake valve device 8 is interposed between pipes 19 and 18 for controlling communication between the accumulator 7 and the interceptor valve device 9. The valve device 8 may be of any suitable type such as the one, for example, disclosed in U. S. Patent No. 2,324,910 issued to Earle S. Cook on July 20, 1943, said valve device being of the self-lapping type having a brake release position for opening pipe 18, through pipe 26, to sump 5 for releasing the brakes on the airplane and movable out of said release position into a brake application zone to allow fluid to flow from the accumulator 7, through pipe 19, to pipe 18 at a pressure proportional to the extent of such movement, for applying said brakes in a manner to be more fully described.

According to the invention, the interceptor valve device 9, which is mounted on the strut assemblage 2, is interposed between pipes 18 and 17 for controlling communication between the brake valve device 8 and the release valve device 11. The interceptor valve device 9 comprises a casing having slidably mounted therein a slide valve 27 having one end projecting downwardly beyond the limits of said casing and the other end projecting into a chamber 28 at the opposite end of said casing, which chamber is vented to atmosphere by a port 29. The end of the slide valve 27 projecting into chamber 28 has associated therewith a follower plate 30 against which a spring 31, contained in chamber 28, bears, the other end of said spring bearing against an end wall 32 of the casing. The spring 31 is adapted for biasing slide valve 27 toward a normal position, in which it is shown in the drawing and which will be hereinafter described.

The casing of the interceptor valve device 9 is provided with three passageways 33, 34 and 35; passageway 33 being connected to pipe 18, passageway 34 being connected to pipe 17 and passageway 35 being connected to an exhaust pipe 36. A reduced portion 37, substantially intermediate the ends of the slide valve 27, is adapted to register with passageways 33 and 34 when said valve is in a normal position, in which it is shown in the drawing, thereby connecting pipe 18 with pipe 17, and to register with passageways 34 and 35 when said valve is in a cut-off position, defined by contact with the casing end wall 32, for disconnecting pipe 18 from pipe 17 and connecting pipe 17 with pipe 36. A screw 38 is adjustably and coaxially mounted in the end of slide valve 27 opposite the follower plate 30 for adjusting the length of said valve by screwing said adjusting screw into or out of said valve, and is locked in an adjusted position by a lock nut 39. Sealing rings 40, 41, having sealing and sliding contact with the slide valve 27 at each end thereof, are disposed in the casing to prevent leakage of fluid under pressure out past the end portions of said valve.

The hinged lever 10, which controls the interceptor valve device 9, comprises two arms 42, 43 pivotally connected to each other at one end by means of a pin 44, the opposite end of arm 42 being pivotally anchored to the strut assemblage 2 by means of a pin 45, while the opposite end of arm 43 is pivotally anchored to the cylinder assemblage 3 by means of a pin 46. A plate or lever, 47, which is fixedly attached to the end of the arm 42 adjacent the pin 45, is adapted for engaging the adjusting screw 38 of the slide valve 27 for operating said valve to its cut-off position when the cylinder assemblage 3 moves to its unloaded position.

The release valve device 11, shown in outline in the drawing, is fixedly mounted on a non-rotatable portion 48 of the wheel mounting and is interposed between pipes 17 and 16 for controlling communication therebetween and is also connected to exhaust pipe 36 for controlling communication between pipes 16 and 36, pipe 36 being connected to a pipe 49 returning to the sump 5. The release valve device 11 may be, for example, generally like the valve device designated as the "AH-1 Decelostat Valve (Hydraulic)" in publication No. APC D8130-1 of the Westinghouse Air Brake Company, Industrial Products Division, dated September 1951.

Briefly, the device 11 comprises valve means (not shown) having a normal position in which communication between pipes 17 and 16 is open by way of a communication 50 indicated, schematically, by dash lines, and a hydraulic pressure release position in which communication between said pipes 17, 16 is closed, and pipe 16 and thereby chamber 15 of the brake cylinder device 4 are connected to pipe 36 by way of a communication 51 also indicated, schematically, by dash lines.

The release valve device 11 also comprises a pilot valve (not shown) mechanically operable for rendering either one or the other of communications 50 or 51, as above described, effective. This pilot valve has a stem 52 projecting beyond the exterior of said casing, said valve stem being arranged to have its projecting end engaged by a T-shaped operating lever 53 at the junction of two oppositely extending arms. The two arms of lever 53 have near their ends slots 54 and 55 through which pins 56 and 57, respectively, secured to the casing, extend. Two like springs 58 and 59, under pressure, are interposed between the casing of the device and the respective opposite ends of the two arms of operating lever 53 to bias said lever to a central normal position in which said lever disengages the end of valve stem 52 to render communication 50 effective and to close communication 51, said operating lever being pivotable about either of pins 56 or 57 so as to engage and move the valve stem 52 into the device 11 to close communication 50 and open communication 51. A portion of operating lever 53 depends from the junction of the two oppositely extending arms and is pivotally connected at its lower end by means of a pin 60 to one end of a link rod 61, the other end of said link rod being pivotally connected to one end of a rocker arm 62 by means of a pin 63. The other end of the rocker arm 62 is rigidly attached to an operating shaft 64 of the control device 12.

The control device 12, which is shown in outline in the drawing, may be of any suitable type, but preferably is a rotary type, such as that disclosed, for example, in the aforementioned patent issued to Rankin J. Bush, including a housing adapted to be coaxially and fixedly mounted on the wheel 1. While not shown in the drawing and not deemed essential to an understanding of the invention, the housing of the control device 12 contains a relatively rotatable rotary inertia mass connected through clutch means and a cluster of planetary gears to the operating shaft 64, so that, when rotation of said inertia mass is in synchronization with the rotation of the landing wheel 1, or what may becalled a normal rotating position occupied when said wheel is not slipping on the runway, no rotative effect is produced on said operating shaft, and the release valve device 11 will occupy its normal position, but when said wheel is accelerating to ground speed immediately following touchdown or when said wheel is decelerating in response to slip on the runway, said inertia mass will either lag behind or overrun, respectively, said wheel and operate said shaft to in turn operate the release valve device 11 to its release position.

While, for purposes of illustration, only one landing wheel assemblage is shown in the drawing, it should be understood that each landing wheel of an airplane is intended to be similarly provided with a brake control apparatus embodying the invention and to be controlled in the manner now to be described for the landing wheel 1 shown in the drawing.

In operation, let it be assumed that the airplane is accelerating down the runway for a take-off, that, therefore, the weight of the airplane is resting on the landing wheels, and that the several devices comprising the brake control apparatus are in their respective normal positions, in which they are shown in the drawing. As the airplane commences to be airborne, the weight of said airplane will gradually be reduced on the landing wheels, and the cylinder assemblage 3 will gradually move out of the strut assemblage 2. As the cylinder assemblage 3 moves out of the strut assemblage 2, the hinged lever 10 will open and cause the end of arm 42 carrying the plate 47 to pivot in a clockwise direction, as viewed in the drawing, about the pin 45. When the airplane is completely airborne, the cylinder assemblage 3 will have moved to its unloaded, or a completely extended position, and the hinged lever 10 will have opened sufficiently for the plate 47 to have contacted the screw 38 on the slide valve 27 and to have operated said valve upwardly to its cutoff position, as above described.

As long as the airplane remains airborne and no weight is resting on the landing wheel 1, the slide valve 27 will be maintained in its cut-off position by the plate 47. With the valve 27 in its cut-off position, communication between pipes 18 and 17 is closed, while pipe 17 will be connected, by way of the reduced portion 37 on said valve, to the exhaust pipe 36. Therefore, any attempt by the pilot of the airplane, whether intentional or inadvertent, to make a brake application by operating the brake valve device 8 to its application position, will merely result in hydraulic fluid under pressure flowing from the accumulator 7 through pipe 19, through the brake valve device 8, and back to the sump 5 by way of pipes 26 and 49.

Assuming now that the airplane is approaching the runway for a landing, the pilot, according to the invention, need not wait until the landing wheels have made contact with the runway surface and accelerated to the ground speed of the airplane before operating the brake valve device 8 out of its release position to a brake application position. With some brake control apparatus, in order to avoid landing with the landing wheels in a locked position and sliding said landing wheels on the runway, the pilot must use his judgment as to the proper time to make a brake application after said wheels have touched down and accelerated sufficiently to be effectively braked. With my invention, however, the pilot may operate the brake valve device 8 to a brake application position prior to such touchdown of the wheels and may then turn his attention to other operations required when landing the airplane, it being noted that the brakes on the airplane will not apply, however, so long as no weight is resting on the landing wheel 1 and the valve 27 is in its cut-off position and said wheel is rotating at less than ground speed, in other words, said wheel will, therefore, remain free to rotate upon touchdown and until it accelerates to ground speed of the airplane, as will now be brought out.

When the wheel 1 contacts the runway surfaces, and as the weight of the airplane gradually comes to rest on said wheel, the cylinder assemblage 3 will be telescoped into the strut assemblage 2 to produce a relative motion that will close the hinged lever 10, allowing the plate 47 to be rotated about the pin 45 in a counterclockwise direction, as viewed in the drawing, and out of engagement with the adjusting screw 38 of the slide valve 27. The point at which the plate 47 disengages the slide valve 27, determined by a chosen portion of the airplane weight resting on the wheels, is adjustable by adjusting the screw 38 on said valve, as previously described.

As the plate 47 on the hinged lever 10 rotates away from the slide valve 27, the spring 31 will move said slide valve back to its normal position, in which pipe 18 will be connected to pipe 17 leading to the release valve device 11, thereby allowing, with the brake valve device 8 already in application position, hydraulic fluid under pressure from the accumulator 7 to flow through the interceptor valve device 9 to pipe 17 at a pressure corresponding to the position of said brake valve device.

Immediately upon touchdown of the wheel 1 and prior to movement of valve 27 to its normal position, however, said wheel will start to accelerate and overrun the rotary inertia mass contained in the control device 12 and thereby effect an angular movement of the operating shaft 64 and the rocker arm 62 out of normal position in a clockwise direction, as viewed in the drawing. This movement of arm 62, acting through link rod 61, will rock the lever 53 of the release valve device 11 about the pin 56 in a counterclockwise direction, as viewed in the drawing, against the opposing force of the spring 59. This rocking of lever 53 will actuate the stem 52 and the pilot valve contained in the release valve device 11 to render communication 50 ineffective and communication 51 effective, thereby closing communication between pipe 17, which is not yet open to pipe 18, and chamber 15 of the brake cylinder device 5 and maintaining said chamber open to sump 5 whereby the brakes on wheel 1 will remain released.

The control device 12 will respond to acceleration of the wheel 1 to open chamber 15 in the brake cylinder device 4 to sump 5, as just described, almost instantaneously at the start of acceleration of the wheel 1 following touchdown which, cooperating with valve 27 to prevent a brake application to and a locking of said wheel upon touchdown, will maintain the brakes on said wheel released until said wheel has accelerated substantially to ground speed, even though the brake valve device 8 may have been operated to its application position prior to said touchdown. It is desired to point out that even should the pilot "pancake" the airplane in landing with the brake valve device 8 in its application position, so that there would be an almost instantaneous loading of the wheel 1, there would be no locking of said wheel, since the time required for the cylinder assemblage 3 to move from its unloaded position to its fully loaded position would be sufficient to allow the wheel 1 to start accelerating and thereby operate the control device 12 to prevent a brake application.

After the airplane has firmly settled on the runway, so that sufficient load is resting on the landing wheels to maintain the cylinder assemblage 3 in its loaded position, the interceptor valve device 7 will remain in its normal position connecting pipe 18 with pipe 17, and after the landing wheel has accelerated to approximately ground speed, the control device 12 will close communication 51 and open communication 50 whereby hydraulic fluid at desired braking pressure, determined by the position of the brake valve device 8, and now present in pipe 17, will be transmitted to pipe 16 and chamber 15 of the brake cylinder device 4 for actuating piston 14 therein, against opposing force of spring 25, to effect braking of the wheel 1.

With the brakes thus applied to the wheel 1, should said wheel run into an uneven or slippery condition on the runway where the traction is insufficient to keep said wheel rolling at ground speed against the retarding action of the brakes applied thereto and said wheel begins to slip, the wheel-slip detecting device 12 will respond to such slipping and cause the release valve device 11 to operate to automatically release said brakes and then, upon cessation of said slipping, to reapply said brakes, substantially as described in the aforementioned patent issued to Rankin J. Bush, until eventually the airplane comes to a stop, it being noted that actual locking and sliding of said wheel is positively prevented during stopping of the airplane.

It is desired to point out that the interceptor valve device 9 may also be used in a brake system not equipped with the release valve device 11 and the wheel-slip control device 12 by connecting pipe 17 directly with pipe 16 and by connecting the passageway 35 of the interceptor valve device 9 directly to the return pipe 49. In this case the braking of the wheel 1 is controlled solely and directly by the manually operable brake valve device 8, the interceptor valve device 9 operating in the same manner as above described to prevent a brake application to said wheel until after, in landing, said wheel has touched down to the ground and is supporting a chosen portion of the weight of the airplane and, therefore, has become accelerated to some degree.

Description—Fig. 2

In this embodiment of the invention, a source of pneumatic fluid under pressure, which may be in the form of a reservoir 65 ground-charged prior to take-off of the airplane or adapted to be charged by an air compressor on the airplane, a pilot's pneumatic brake control valve device 66 and an interceptor or cut-out valve device 67 are employed in place of the brake valve device 8, the interceptor valve device 9 and the hydraulic pressure supply system, including the sump 5, the pump 6, the accumulator 7 and the return pipes 26, 36 and 49, of Fig. 1. Otherwise, for the purpose of illustration, the structure shown in Fig. 2 may be the same as that shown in Fig. 1 and above described.

The manually operable brake valve device 66 may be of any suitable type, such as that disclosed, for example, in U. S. Patent No. 2,042,112 issued to Ewing K. Lynn and Rankin J. Bush on May 26, 1936, and is interposed between pipes 19 and 18 for controlling communication therethrough between the reservoir 65 and the interceptor valve device 67. The brake valve device 66 is of the self-lapping type, having a release position and an application zone similar to those described in connection with the brake valve device 8 shown in Fig. 1, and generally operates in the same manner as the brake valve device 8 for controlling the pressure of pneumatic fluid supplied to the brake cylinder device 4.

The interceptor, or cut-out, valve device 67, according to the invention, is mounted on the strut assemblage 2 and is interposed between pipes 18 and 17 for controlling communication therethrough between the brake valve device 66 and the release valve device 11. The interceptor valve device 67, for purposes of illustrating the invention, may comprise a casing having a bore 73 opening to one end of said casing. An intake valve 74 is disposed at the opposite end of the bore 73, said valve having a fluted valve stem 75 extending through a separating wall 76, between the bore 73 and a chamber 77 formed in the casing at the opposite side of said wall. A valve seat 78 is provided in the separating wall 77 on which valve 74 is adapted to seat when in a normal position, in which it is shown in the drawing. Chamber 77 is connected by a passageway 79 and a chamber 80 to the pipe 18. A ball-type check valve 81, which is disposed in chamber 80, is adapted normally to close off a by-pass communication 82 connecting pipe 17 with pipe 18 and, under certain other conditions to be more fully described hereinafter, to permit venting of the brake cylinder device 4 to atmosphere past said check valve and by way of an exhaust (not shown) in the brake valve device 66. A spring 84, acting on the check valve 81, urges it toward its normal position. Access may be had to the check valve 81 by way of a closure cap 85 screwed into the casing of the valve device 67 for closing one end of chamber 80.

A cylindrical, cup-like valve follower member 86 is slidably mounted in the bore 73 with the closed end of said follower member abutting the intake valve 74. The closed end of the follower member 86 is provided with a plurality of openings 87 to permit fluid under pressure to flow from chamber 77 past the fluted valve stem 78, when the valve 74 is in an unseated position, into a chamber 88 defined by the follower member 86, the wall of bore 73 and a piston 89 slidably mounted in the bore 73 adjacent the end opposite the valve 74. The follower member 86 is also provided with a plurality of circumferentially arranged openings 90 adapted to register with an annular recess 91 encircling the bore 73 and opening to passageway 83 to permit fluid under pressure to flow from chamber 88, through passageway 83, into pipe 17.

The piston 89 carries, on the side adjacent chamber 88, an exhaust valve 92 arranged oppositely and in co-axial relation to the intake valve 74, said exhaust valve being adapted to normally seat on a valve seat 93 formed on said piston. A fluted valve stem 94 is associated with the exhaust valve 92 and extends away from said valve into a cylindrical recess 95 formed in the piston 89 at the side opposite chamber 88. The fluted stem 94 is adapted to permit exhaust of fluid pressure from chamber 88 to atmosphere when the exhaust valve 92 is in an unseated position. A spring 96, having one end bearing against the follower member 86 and the other end bearing against the exhaust valve 92, is provided to normally urge said exhaust valve and the intake valve 74 toward their respective seated positions.

A cup-like follower member 97 is slidably received in the recess 95 of the valve carrying member 89, with the open end of said follower member adjacent the base of said recess. A valve operating rod 98, which is formed integrally and co-axially with the follower member 97, has one end projecting into the recess 95 and is adapted to engage the end of the valve stem 94 for lifting the valve 92 from its seated position while the opposite end of said valve operating rod, which extends to the exterior of the valve device 67, is disposed for engagement by the hinged lever 10 in a manner to be hereinafter described. A spring 99 is provided in the recess 95 with one end bearing against the base of said recess and the other end bearing against the closed end of the follower member 97 for urging said follower member, and consequently the valve operating rod 98, toward a normal position, in which said operating rod is disengaged from the valve stem 94 and in which it is shown in the drawing. The spring 99 is of greater strength than the combined opposing forces of pneumatic fluid in chamber 88 acting on the piston 89 and of the spring 96 acting on said piston through the valve 92, for reasons which will hereinafter be explained. The closed end of the follower member 97 is provided with exhaust ports 100 opening to atmosphere to permit venting of chamber 88 to atmosphere by way of the fluted stem 94, the recess 95 and said exhaust ports 100 when the valve 92 is in its unseated position. A snap ring 101, which is disposed in an internal annular groove on the piston 89 adjacent the open end of the recess 95, is adapted for limiting outward movement and thereby defining a normal position of the follower member 97 relative to said piston. A second snap ring 102 is disposed in an internal annular groove in the casing adjacent the open end of the bore 73 for limiting outward movement and thereby defining a normal position of the piston 89 relative to said casing. A sealing O-ring 103, mounted externally on the piston 89, has sealing and sliding contact with the surface of the bore 73 to prevent leakage of fluid under pressure from chamber 88 past said piston.

A screw 104, for engagement by plate 47, is adjustably mounted in the portion of the valve operating rod 98 projecting to the exterior of the casing of the valve device 67 for adjusting the length of said operating rod by screwing said screw into or out of said operating rod. A lock nut 105 is provided to lock the screw 104 in an adjusted position.

In operation, once more let it be assumed that the airplane is accelerating down the runway for a take-off, that, therefore, the weight of the airplane is resting on the landing wheels, that the reservoir 65 is charged with pneumatic fluid under pressure, and that the several devices comprising the brake control apparatus are in their respective normal positions, in which they are shown in the drawing. As the airplane begins to lift off the ground, the weight of said airplane will gradually be reduced on the landing wheels, and the cylinder assemblage 3 will gradually move out of the strut assemblage 2.

As the cylinder assemblage 3 moves out of the strut assemblage 2, the hinged lever 10 will open and cause the end of arm 42 carrying th plate 47 to pivot about the pin 45 in a clockwise direction, as viewed in the drawing, until said plate engages the screw 104 of the valve operating rod 98. The point at which the plate 47 engages the rod 98 is determined by adjusting the screw 104. Having engaged the rod 98, the hinged lever 10 will continue to open as the cylinder assemblage 3 moves further out of the strut assemblage 2 so that the plate 47 will operate the rod 98 upwardly, as viewed in the drawing. Acting through the follower member 97 and the spring 99, the operating rod 98, as it is forced upwardly by the plate 47, will move the piston 89 in the same direction against the opposing forces of the spring 96 and any fluid pressure in chamber 88 acting on said piston, until said piston makes abutting contact with the follower member 86, carrying said follower member 86 in the same direction until the intake valve 74 is firmly seated on its seat 78. Further upward movement of the operating rod 98 will result in compression of the spring 99 and will bring the portion of said operating rod extending into recess 95 into engagement with the valve stem 94 of the exhaust valve 92 to unseat said exhaust valve, thereby venting chamber 88 and pipe 17 to atmosphere by way of the fluted valve stem 94, recess 95 and the ports 100 in the follower member 97. As long as the airplane remains airborne and no weight is resting on the wheel 1, the hinged lever 10, in its open position, will maintain the exhaust valve 92 in its unseated position, thereby positively preventing a brake application by venting to atmosphere any fluid pressure which might leak past the seated valves 81 and 74 from pipe 18, should the brake valve device 66 be operated to a brake applying position.

Assuming now that the airplane is approaching the runway for a landing, the pilot, as pointed out above and according to the invention, need not wait until the landing wheels have contacted the ground and accelerated to the ground speed of the airplane before operating the brake valve device 66 to permit flow of brake applying fluid from reservoir 65 to pipe 18. The pilot may so operate the brake valve device 66 before the wheel 1 contacts the runway surface, for as long as no weight is resting on said wheel, no brake application can be effected, and, therefore, said wheel will remain free to rotate upon touchdown and until said wheel accelerates to ground speed of the airplane.

When the wheel 1 contacts the runway surface, and as the weight of the airplane gradually comes to rest on said wheel, the cylinder assemblage 3 will telescope into the strut assemblage 2 to produce a relative motion between said cylinder assemblage and said strut assemblage that will close the hinged lever 10, allowing the plate 47 to be rotated about the pin 45 in a counterclockwise direction, as viewed in the drawing. Rotation of the plate 47, as just described, will release the compressive force on the spring 99, acting through the rod 98 and the follower member 97, to permit said spring to bias said rod and said follower member toward their normal position. During the initial downward motion, as viewed in the drawing, of the rod 98 and the follower member 97, said rod and said follower member will move relatively to the piston 89, until the follower member 97 engages the snap ring 101. During this initial movement, spring 96 will seat the exhaust valve 92, but piston 89 temporarily will remain in its abutting engagement with the follower member 86 to maintain the intake valve 74 in its seated position. At the point at which the follower member 97 contacts the snap ring 101 and with further rotation of the plate 47 about the pin 45, the spring 99 will no longer be effective to keep the piston 89 in abutting engagement with the follower member 86 to keep the intake valve 74 seated. The fluid pressure in chamber 77, acting on the side of the intake valve 74 adjacent said chamber, will then be sufficient to open said intake valve against the opposing force of the spring 96 to permit fluid under pressure to enter chamber 88 and to act on the piston 89 to force said piston and the rod 98 with the follower 97 toward their normal position defined by engagement of said piston with the snap ring 102. Having opened the intake valve 74, in the manner just described, fluid under pressure may flow through the ports 90 into the recess 91, thence through passageway 83 and pipe 17 to the release valve device 11.

Since a certain amount of time, brief though the interval may be, is required from the instant the landing wheel 1 contacts the ground until the intake valve 74 is opened, as above described, there is no possibility of landing with the wheel 1 braked and in a locked condition and thereby sliding said wheel on the runway, even if the pilot, as noted above, may have operated the brake valve device 66 to an application position in its application zone prior to touchdown of said wheel, due to operation of the control device 12, as will be presently described. The wheel 1, therefore, will be free to rotate upon touchdown and will start to accelerate immediately to ground speed of the airplane.

As pointed out in connection with Fig. 1, the control device 12 will respond almost instantaneously to the start of acceleration of wheel 1 following touchdown and prior to pressurization of fluid in pipe 17 to operate the release valve device 11, in the manner similar to that described in the aforementioned patent issued to Rankin J. Bush, to close communication 50 and open communication 51. With communication 51 open, the pressure chamber 15 in the brake cylinder device 4 will be vented, through pipe 16 and communication 51, to atmosphere to prevent a brake application. When the wheel 1 has substantially accelerated to ground speed of the airplane, the control device 12 will operate the release valve device 11 to close communication 51 and open communication 50 whereupon fluid under pressure, caused to be supplied by the brake valve device 66 and now present in pipe 17, will flow to pipe 16 and thence to the brake cylinder device 4 to apply the brakes on said wheel.

With the brakes applied to the wheels 1, should said wheel run into an uneven or slippery condition on the runway, the inertia device 12 and the release valve device 11 will operate to automatically release and reapply said brakes in a similar manner as described in the aforementioned patent of Rankin J. Bush.

After landing and while bringing the airplane to a stop, the pilot may desire, in addition to the automatic control of the brakes by the control device 12 and the release valve device 11, to control said brakes manually by manipulating the brake valve device 66. With communication 50 of the release valve device 11 open, if the pilot desires to effect a brake release, he will operate the brake valve device 66 to its release position to release fluid under pressure from chamber 80 of the interceptor valve device 67, whereupon the check valve 81 will be unseated by pressure in chamber 88 and by-pass communication 82 to permit release of fluid under pressure from the brake cylinder chamber 15 through said chamber 88 and said by-pass communication to atmosphere via the brake valve device 66. After such brake release, the pilot may reapply the brakes, if he so desires, by again moving the brake valve device 66 to an application position in which fluid under pressure will again be supplied to pipe 18 and flow therefrom past valve 78 and through pipe 17 and the release valve device 11 to the brake cylinder device 4 as will be clear from previous description.

As was noted with respect to the brake control apparatus described in connection with Fig. 1, it should also be understood, with respect to the brake control apparatus shown in Fig. 2, that each landing wheel of the airplane should be provided with a brake control apparatus embodying the invention, even though, for purposes of illustration, only one landing wheel assemblage is shown.

In similar manner, as noted in connection with Fig. 1, the interceptor valve device 66 may, if desired, also be used in a brake system not equipped with the wheel-slip control devices 11 and 12 by connecting pipe 17 directly with pipe 16; the interceptor valve device 67 then operating, as above described, to prevent a brake application to the wheel 1 until after said wheel has touched down and accelerated to some degree.

Summary

It should now be apparent that I have provided, for use on airplanes equipped either with pneumatic or hydraulic pressure brake systems, means which will prevent any brake application to and locking of the landing wheels prior to touchdown of said pilot may operate the brake control valve device to a brake application position while the airplane is yet airborne, and which means, when employed in conjunction with wheel-slip control devices, will prevent a brake application to the landing wheels not only until after said wheels have touched down, but also until after said wheels have accelerated to substantially the ground speed of the airplane.

Having now described my invention, what I claim as new and desire to secure by Letters Patent, is:

1. In a fluid pressure operable brake control apparatus for the landing wheel of an airplane having resilient body supporting structure comprising two relatively moving members, one connected to the body of the airplane and the other to said wheel, the combination comprising a source of fluid under pressure, a brake cylinder device responsive to fluid pressure for effecting a brake application on said wheel and to relief of such pressure for effecting a brake release, conduit means providing for flow of fluid under pressure from said source to said brake cylinder device, manually operable valve means for controlling the pressure of fluid supplied to said brake cylinder device, a release valve device interposed in said conduit means between said manually operable valve means and said brake cylinder device, said release valve device having one position for effecting supply of fluid under pressure to said brake cylinder device and operable to another position for relieving said brake cylinder device of fluid pressure, control means arranged to respond to a slipping condition of said wheel for effecting operation of said release valve device to its said other position and to respond to cessation of said slipping condition for effecting operation of said release valve device to its said one position, an interceptor valve device mounted on said one supporting member and interposed in said conduit means between said manually operable valve means and said release valve device, said interceptor valve device being operable to one position to close communication through said conduit means and operative to another position to open said communication, and a hinged lever device comprising a first arm having one end pivotally connected to said one supporting member and a second arm having one end pivotally connected to said other supporting member, with the opposite ends of said arms pivotally connected to each other, said lever device being adapted to effect operation of said interceptor valve device to its said one position upon disengagement of said landing wheel with the ground and to effect operation of said interceptor valve device to its said other position upon engagement of said landing wheel with the ground.

2. In a hydraulic fluid pressure operable brake control apparatus for the landing wheel of an airplane having a resilient body supporting structure comprising two relatively moving members, one connected to the body of the airplane and the other to said wheel, the combination comprising a source of hydraulic fluid, means for pressurizing said hydraulic fluid, a brake cylinder device responsive to hydraulic pressure for effecting a brake application on said wheel and to relief of such pressure for effecting a brake release, conduit means providing for flow of pressurized hydraulic fluid from said pressurizing means to said brake cylinder device, a manually operable brake control valve device interposed in said conduit means between said pressurizing means and said brake cylinder device for controlling the pressure of fluid supplied to said brake cylinder device, a release valve device interposed in said conduit means between said manually operable valve device and said brake cylinder device, said release valve device having one position providing for supply of fluid under pressure to said brake cylinder device and operable to another position for relieving said brake cylinder device of fluid pressure, control means arranged to respond to a slipping condition of said wheel for effecting operation of said release valve device to its said other position and to respond to termination of said slipping condition for effecting operation of said release valve device to its said one position, an interceptor valve device mounted on said one supporting member and interposed in said conduit means between said manually operable valve device and said release valve device for preventing a brake application on said landing wheel prior to engagement of said wheel with the ground, said interceptor valve device comprising valve means having a first position to close communication through said conduit means and operative to a second position to open said communication, and a hinged lever device comprising a first arm having one end pivotally connected to said one supporting member and a second arm having one end pivotally connected to said other supporting member, with the opposite ends of said arms pivotally connected to each other, said lever device being adapted to effect operation of said valve means to its said first position upon disengagement of said wheel with the ground and to effect operation of said valve means to its said second position upon engagement of said landing wheel with the ground.

3. In a pneumatic fluid pressure operable brake control apparatus for the landing wheel of an airplane having a resilient body supporting structure comprising two relatively moving members, one connected to the body of the airplane and the other to said wheel, the combination comprising a source of pneumatic fluid under pressure, a brake cylinder device responsive to pneumatic pressure for effecting a brake application on said wheel and to relief of such pressure for effecting a brake release, conduit means providing for flow of pneumatic fluid under pressure from said source to said brake cylinder device, a manually operable brake control valve device interposed in said conduit means between said source of pneumatic fluid under pressure and said brake cylinder device for controlling the pressure of fluid supplied to said brake cylinder device, a release valve device interposed in said conduit means between said manually operable valve device and said brake cylinder device, said release valve device having one position providing for supply of fluid under pressure to said brake cylinder device and operable to another position for relieving said brake cylinder device of fluid pressure, control means arranged to respond to a slipping condition of said wheel for effecting operation of said release valve device to its said other position and to respond to termination of said slipping condition for effecting operation of said release valve device to its said one position, an interceptor valve device mounted on said one supporting member and interposed in said conduit means between said manually operable valve device and said release valve device for preventing a brake application on said wheel prior to engagement of said wheel with the ground, said interceptor valve device comprising an intake valve having an unseated position and a seated position in which communication through said conduit means is open and closed, respectively, an exhaust valve adapted in one position for venting said interceptor valve device to atmosphere and in another position for closing said interceptor valve device to atmosphere and a valve operating rod for operating said intake valve and said exhaust valve to their said seated and said one positions, respectively, upon disengagement of said wheel with the ground, and a hinged lever device comprising a first arm having one end pivotally connected to said one supporting member and a second arm having one end pivotally connected to said other supporting member, with the opposite ends of said arms pivotally connected to each other, said lever device having means arranged to engage said valve operating rod for effecting operation of said intake valve to its said seated position and said exhaust valve to its said one position upon disengagement of said wheel with the ground and to disengage said valve operating rod for effecting operation of said exhaust valve to its said other position and said intake valve to its said unseated position upon engagement of said wheel with the ground.

References Cited in the file of this patent

UNITED STATES PATENTS

| | | |
|---|---|---|
| 1,887,583 | Down | Nov. 15, 1932 |
| 2,042,112 | Lynn et al. | May 26, 1936 |
| 2,227,661 | Martinson | Jan. 7, 1941 |
| 2,347,847 | Schnell | May 2, 1944 |
| 2,446,700 | Giles et al. | Aug. 10, 1948 |
| 2,573,387 | Bush | Oct. 30, 1951 |
| 2,574,426 | Trevaskis | Nov. 6, 1951 |
| 2,656,017 | Trevaskis | Oct. 20, 1953 |
| 2,692,100 | Trevaskis | Oct. 19, 1954 |

FOREIGN PATENTS

| | | |
|---|---|---|
| 471,488 | Great Britain | Sept. 3, 1937 |

OTHER REFERENCES

APC D-8130-1 "Aircraft Decelostat," September 1949. (Publication by The Westinghouse Air Brake Co.)